Figure 1:
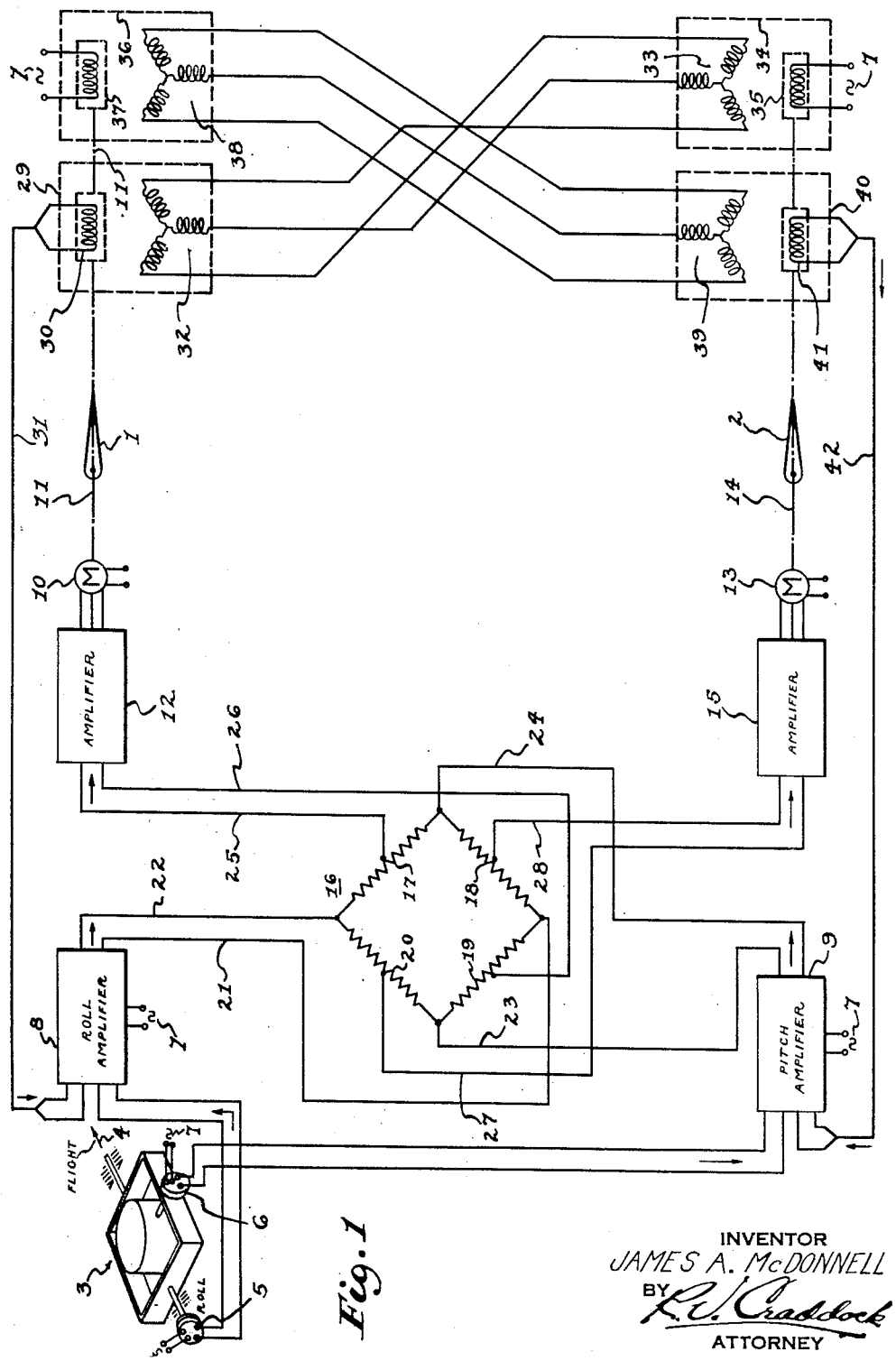

Nov. 6, 1956   J. A. McDONNELL   2,769,603
CONTROL SYSTEM FOR AIRCRAFT SURFACES
Filed April 27, 1951   2 Sheets-Sheet 1

INVENTOR
JAMES A. McDONNELL
BY R. J. Craddock
ATTORNEY

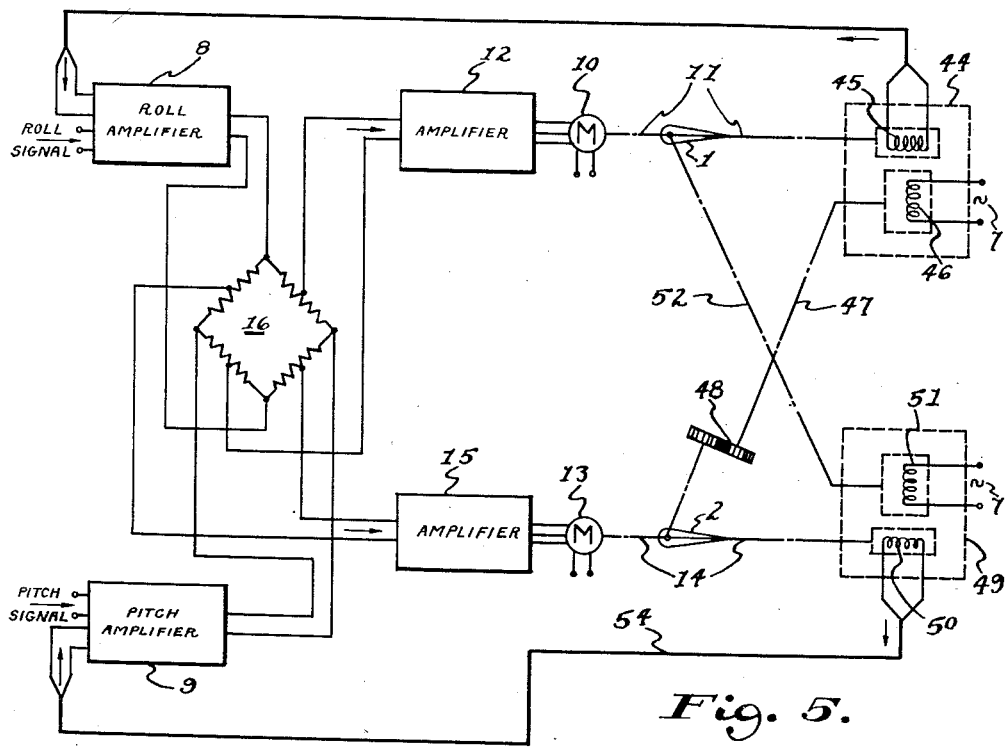

2,769,603
Patented Nov. 6, 1956

2,769,603

CONTROL SYSTEM FOR AIRCRAFT SURFACES

James A. McDonnell, Flushing, N. Y., assignor to Sperry Rand Corporation, a corporation of Delaware Application April 27, 1951, Serial No. 223,353

10 Claims. (Cl. 244—77)

The present invention relates generally to systems comprising two servomotor loops wherein the servomotors of both loops are controlled in accordance with an input signal to provide equal outputs from both servomotors. However, for various reasons, for example, due to unequal gains in the two loops or in the amplifiers embodied therein, or, by reason of any other inequality in the two loops, whether it be of a mechanical or electrical nature, the outputs of the two servomotors may be unequal. The present invention therefore broadly relates to systems of the foregoing character wherein means are provided to bring about equal servomotor outputs.

More specifically, my invention relates to a control system for aircraft of the type embodying "ailavator" controls. In aircraft of this character, "ailavators" provide the combined function of ailerons and elevators, being displaced from a central or neutral position in opposite directions to provide aileron control and in the same direction to provide elevator control. Whether the "ailavators" are moved in accordance with a pitch or roll signal, they should in each instance be displaced equal amounts otherwise instead of performing a single function in accordance with one of these signals, that is, roll or pitch, they will perform two functions that is both roll and pitch control. Obviously, when either a roll or pitch signal alone is present, it is undesirable to experience a dual function of the "ailavators" due to unequal displacements thereof.

The present invention therefore specifically relates to an "ailavator" control system wherein the two servomotors are controlled to provide equal displacements of the "ailavators" from their central or neutral positions when either a roll or pitch signal alone is present.

It is an object of the present invention to provide a system comprising two servomotor loops each comprising a servomotor and a signal generator driven thereby which is connected in feedback fashion to both loops and wherein means are provided for modifying the feedback signal which is produced in one loop in accordance with the output of the servomotor in the other loop; and another object resides in providing a system of this character in which the feedback signals produced in both loops are dependent upon the servomotor outputs in both loops.

It is a further object to provide a system wherein two servomotors are operated in accordance with an input control signal to provide a corresponding displacement in the outputs thereof and wherein means are provided for insuring that the displacement outputs of the two servomotors are equal.

It is a further object to provide a system wherein two servomotors are driven in the same direction in response to one signal input and in opposite directions in response to a second signal input and means are provided for rendering the displacement outputs of the servomotors equal whether they occur in the same or in opposite directions.

Still another object resides in providing a control system for "ailavators" which includes means for rendering the displacements of the "ailavators" equal when a pitch or roll signal alone is supplied to the control system.

With the foregoing and still other objects in view, my invention includes the novel elements and the combinations and arrangements thereof described below and illustrated in the accompanying drawings, in which—

Fig. 1 is a wiring diagram of a preferred embodiment of the present invention;

Fig. 2 diagrammatically represents the desired displacement outputs of the two servomotors embodied in Fig. 1 under one mode of operation;

Fig. 3 schematically illustrates how correction is effected when unequal displacements occur under a roll signal;

Fig. 4 schematically illustrates how correction is effected when unequal displacements occur under a pitch signal;

Fig. 5 is a wiring diagram illustrating, in a somewhat schematic manner, a modification of this invention; and Fig. 6 illustrates one form of "ailavator" controlled aircraft.

It will be seen that an "ailavator" control system of the character herein illustrated constitutes one example of the type of system to which the present invention relates and hence it will be understood that the following description will serve to illustrate a particular application of the present invention and to exemplify it in its broader aspects.

As herein above pointed out, some types of aircraft, such as that shown in Fig. 6, employ "ailavators" which serve the dual functions of elevators and ailerons. In Fig. 1, one of these "ailavators," such as the port "ailavator," is indicated at 1, and the other "ailavator," such as the starboard "ailavator," is indicated at 2. These "ailavators" jointly serve to control the attitude of the craft in pitch and roll, the control signals being derived, for example, from a gyro vertical indicated generally at 3. The arrow 4 indicates the direction of flight of the craft. A roll pick-off indicated generally at 5 is associated with the fore and aft axis of the gyro 3 to provide a signal proportional to deviation of the craft in roll from the datum position defined by the gyroscope. Similarly, a pitch pick-off 6 is associated with the athwart-ships axis of the gyroscope to provide a signal dependent upon pitch deviations of the craft from the pitch reference provided by the gyroscope. These pick-offs may be of any conventional character and are herein represented as pick-offs of the selsyn type. These pick-offs are energized from a suitable source of alternating current 7 and provide an alternating signal voltage having an amplitude proportional to the displacement measured thereby and of a phase sense dependent upon the direction of said displacement.

In the embodiment illustrated, the roll signal is supplied to a pre-amplifier 8 which, for example, may function as a phase-sensitive demodulator to provide a voltage output having a polarity depending upon the phase sense of the alternating input signal and having a magnitude proportional to the amplitude of the input signal. In a similar manner, the pitch signal may be supplied to a phase-sensitive demodulator 9.

It will be noted that both pitch and roll signals are applied to both the servo mechanisms driving the port and starboard "ailavators" 1 and 2, the roll signal effecting displacements of the "ailavators" in opposite directions and the pitch signal effecting displacements thereof in like directions. The "ailavator" 1 is driven by the servomotor 10 as schematically represented by the dot-dash line 11. The motor 10 is controlled by amplifier 12 in any conventional manner. Similarly, "ailavator" 2 is driven by motor 13 as schematically indicated by the dot-dash line 14 and motor 13 is controlled by amplifier 15. It will be noted that motors 10 and 13 may be electric motors, hydraulic motors or motors of any desired nature, provided they function to drive the "ailavators" in reversible directions and through displacements proportional to the signal inputs to the amplifiers controlling these motors. For exemplary purposes, motors 10 and 13 are shown as electric motors which are differentially controlled by the differential outputs of the amplifiers 12 and 15.

To supply the output of the roll amplifier 8 to both of the amplifiers 12 and 15 and also to provide the output of pitch amplifier 9 to both of the amplifiers 12 and 15, I preferably provide a bridge network indicated generally at 16 for this purpose. This network will supply the roll signal derived from the roll amplifier 8 in opposite polarity sense to the two amplifiers 12 and 15 while the pitch signal derived from the pitch amplifier 9 will be supplied thereby in like polarity sense to the amplifiers 12 and 15. To this end, the bridge 16 comprises four arms formed of center tapped resistors 17, 18, 19 and 20. The output of roll amplifier 8 is supplied by leads 21 and 22 across one diagonal of the bridge 16 while the output of pitch amplifier 19 is supplied by leads 23 and 24 across the other diagonal of the bridge. Leads 25 and 26 are connected, respectively, to the mid taps on the resistors 17 and 19 and to the input to amplifier 12. Leads 27 and 28 are connected, respectively, to mid taps on the reistors 18 and 20 and are connected to the input of amplifier 15. In this manner, it will be seen that the signal from pitch amplifier 9, which is supplied across one diagonal of the bridge, is supplied in like polarity sense to the inputs to the amplifiers 12 and 15. However, the roll signal which is supplied from roll amplifier 8 across the other diagonal of the bridge will be supplied in opposite polarity sense to the amplifiers 12 and 15. Hence, when a roll signal is provided by the roll pick-off 5 it will function to drive servomotors 10 and 13 in opposite directions to thereby displace the "ailavators" 1 and 2 in opposite directions. A pitch signal, of course, will drive the servomotors 10 and 13 in the same direction and thereby produce like directions of movement of the "ailavators."

To provide a displacement of the "ailavators" which is proportional to the deviation detected by the pick-offs, I have schematically shown a selsyn 29 as driven by the motor 10. The selsyn 29 is used as a displacement feedback generator and the signal output thereof, derived from its rotor 30, is supplied by cable 31 in degenerative fashion to the roll amplifier 8. If the generator 29 were used alone to provide a signal output proportional to the displacement of its rotor relative to its stator, the feedback signal would subtract from the roll signal to provide a displacement in the output of the servomotor 10 that is proportional to the angular deviation detected by the roll pick-off. However, in accordance with my invention, the signal derived from signal generator 29 is modified by the movement or displacement provided by the servomotor 13. In the embodiment illustrated, the selsyn 29 is arranged as a signal transformer, the stator 32 thereof being connected in multi-circuit fashion with the stator windings 33 of a selsyn transmitter 34, the rotor 35 of which is driven by the servomotor 13. The rotor of selsyn transmitter 34 is energized from a suitable source of alternating current such as source 7.

A second and similar data transmission system for providing a displacement feedback signal from the output of one servomotor which is modified in accordance with the output of the other servomotor is also provided. This second system comprises a selsyn transmitter 36 having a rotor 37 driven from the output of servomotor 10 and energized from a suitable source of alternating current such as source 7. The stator 38 of selsyn 36 is connected in multi-circuit fashion with the stator 39 of signal transformer 40. The rotor of transformer 40 is driven from the output of servomotor 13 and its rotor winding 41 is connected through cable 42 in degenerative fashion to the input of pitch amplifier 9. Although the units of the data systems have been termed selsyns, it will be understood that other types of signal generators or units may be employed.

The operation of the signal feedback systems driven by the outputs of both servomotors will perhaps best be understood when the illustrations in Figs. 2 through 4 are additionally considered. First, assume that a roll signal is derived from the roll pick-off. This should cause the servomotors to drive in opposite directions and provide a displacement of the "ailavator" 1 through the angle $\theta_p$ and the displacement of the "ailavator" 2 in the opposite direction through a displacement $\theta_s$ where $\theta_p = \theta_s$. However, since the "ailavators" are separately driven in separate servo loops, this angle may not be equal due to relative variations in the two systems. One servo loop, for example, comprises the amplifier system to which the common, pitch or roll control signal is supplied, motor 10 and its associated displacement feedback generator, assuming that this displacement is not corrected in the manner contemplated by the present invention. Similarly, the other servo loop comprises the amplifier system to which the common control signal is supplied, the motor 13 and its associated displacement feedback signal generator, again assuming no correction is provided for. Under these conditions, although the input signal is the same, the outputs of the two servo loops may be different that is, $\theta_p$ may not equal $\theta_s$.

This condition is illustrated in Fig. 3 wherein the "ailavator" 1 is illustrated as displaced through the angle $\theta_p$ while the "ailavator" 2 is displaced in the opposite direction through the angle $\theta_s$, and these angles are clearly unequal. In accordance with my invention, however, the displacement signal which is fed back in both loops is modified in accordance with the displacement output of the servomotor in the other loop in such a manner that the angles $\theta_p$ and $\theta_s$ will be made equal as represented by the dotted line positions 1' and 2' of the "ailavators" in Fig. 3. Assuming as above that a roll signal alone is present, this means that the motors 10 and 13 drive in opposite directions. When the signal corresponding to the displacements measured by the transformer 29 and the transmitter 34 is equal to the roll signals, the resultant signal input to the amplifiers 12 and 15 will be zero and the two servo loops will be quiescent. However, if these displacements are unequal, as illustrated in full lines in Fig. 3, then the transmitter 36 and transformer 40 whose rotors are likewise driven in opposite directions will provide a signal output which is dependent upon the difference in angular rotations thereof since the stators are reversely connected so that their fields rotate in relatively opposite directions. In other words, if the rotors of the transmitter 36 and transformer 40 were to be rotated in opposite directions and to equal extents, then zero signal output would be derived from the transformer 40 and hence no correction would be made. However, if these angular movements are dissimilar, a signal will be derived from signal transformer 40 which is proportional to the difference in angular movements of the outputs of servomotors 10 and 13 and this signal will be supplied to the pitch amplifier 9. As above pointed out, the output of pitch amplifier 9 is applied in like polarity sense to the two amplifiers 12 and 15. The output of pitch amplifier 9 due to the repeatback signal derived from transformer 40 is arranged to reduce the displacement provided by motor 10 in the example herein given and to increase that provided by motor 13, and this correction action will continue during the displacement of the "ailavators" under control of the roll signal to thereby maintain the angular displacements of the two motors substantially equal under both dynamic conditions and under static conditions. Hence, when the "ailavators" occupy the dotted line positions indicated in Fig. 3, the angular displacements thereof will be equal, that is, $\theta_p = \theta_s$, and their displacements will be proportional to the roll signal.

The operation of the system in connection with a pitch signal input will best be understood when Fig. 4 is additionally considered. In Fig. 4 it is assumed that the "ailavator" 1 has been moved through the angle $\theta_p$ which is greater than the angle $\theta_a$ through which the "ailavator" 2 has been moved in response to a pitch signal. It will be remembered that the pitch signal effects rotation of the motors 10 and 13 in a direction to provide like directions of movement of the "ailavators" 1 and 2. Since the signal transformer 36 and signal transformer 40 have their stators reversely connected, measuring the difference in angular displacement thereof for opposite directions of rotation of the "ailavators" 1 and 2, it will be seen that under a pitch signal operation, the rotors of these selsyn devices will be rotated in like directions and hence the signal output derived from transformer 40 will be proportional to the sum of the displacements. This signal is fed back in degenerative fashion to pitch amplifier 9 to provide a displacement output proportional to the angular deviation detected by the pitch pick-off. However, if the angular displacements of the "ailavators" 1 and 2 should not be equal as illustrated in Fig. 4, the other data transmission system comprising the transmitter 34 and transformer 29 will correct for such error. As above pointed out in connection with the operation of this system under the roll signal, the stators of the devices 34 and 29 are connected to provide resultant fields in the stators which rotate in the same direction for opposite directions of drive of the servomotor. Hence, when the motors 10 and 13 drive in similar directions under the influence of a pitch signal, the signal derived from the system comprising the devices 34 and 29 will be proportional to the difference in the displacement outputs of the two servomotors. This signal is fed in degenerative fashion to roll amplifier 8 and, as previously pointed out, the output of amplifier 8 is supplied in opposite polarity sense to amplifiers 12 and 15 to effect opposite directions of drive of the servomotors. This signal is fed back in such fashion that the feedback signal will drive the servomotor having the greater displacement in a rearward direction and that having the lesser displacement in a forward direction until the feedback signal is reduced to zero. Under these conditions, the "ailavators" will occupy the dotted line position 43 shown in Fig. 4.

When the "ailavators" are positioned under the influence of a roll signal as shown in dotted lines in Fig. 3 or when positioned as shown by the dotted line 43 in Fig. 4 under the influence of a pitch signal, the demands on the two servo loops will be satisfied and they will then be quiescent. It will be seen that in both cases, no rolling of the craft is effected when a pitch control signal alone is present and no change in pitch is effected when a roll signal alone is present. As a result, an extremely stable control system is provided.

In Fig. 5 I have shown a modification of my invention which is quite similar to that shown in Fig. 1 so far as the basic servo loops are concerned. In this embodiment of my invention the roll signal is supplied to the roll amplifier 8 which in turn supplies its output in opposite polarity sense to the servo amplifiers 12 and 15 by means of the bridge network 16. Similarly, the pitch signal is applied to the pitch amplifier 9 and its output is supplied by means of bridge 16 in like polarity senses to the two amplifiers 12 and 15. The amplifier 12 controls servomotor 10 which drives "ailavator" 1 as schematically represented by the dash-dot line 11. Similarly, motor 13 drives "ailavator" 2 as indicated by the dash-dot line 14. However, instead of employing a pair of data transmission systems, each comprising two selsyn-like devices, I have in Fig. 5 shown a modification wherein a single selsyn-like instrument may be employed in each servo loop to insure that equal angular displacements occur in both servomotor outputs. A selsyn unit indicated generally at 44 comprises a rotor 45 driven by the output of servomotor 10 as indicated by the dot-dash line 11. This unit comprises an exciting winding 46 which is also rotatable. Winding 46 is rotated by the output of servomotor 13 through a suitable transmission indicated schematically by dot-dash line 47 and reversing gearing 48. The schematic connection between the output of motor 13 and the rotor 46 of the selsyn 34 is intended to designate that the rotor 46 rotates in an opposite direction to the rotor 45 when the two servomotors are driven in like directions. Similarly, signal transmitter 49 comprises a rotor 50, which is driven by servomotor 13, and a rotor 51, shown as comprising the exciting winding, which is driven by motor 10 as schematically represented by the dot-dash line 52. This dot-dash line 52 is intended to represent that the rotor 51 will be rotated in the same direction as rotor 49 when the servomotors are driven in the same direction. The output of selsyn-like unit 44 is connected by means of cable 53 in degenerative fashion to the roll amplifier 8, and the output of signal generator 49 is connected through cable 54 in degenerative fashion to the pitch amplifier 9.

The operation of the embodiment of my invention shown in Fig. 5 is similar to that hereinabove described in connection with Fig. 1. Briefly, under the control of a roll signal, the motors 10 and 13 will drive the "ailavators" in opposite directions. Under the assumed relative arrangement of parts, the rotor 45 of signal generator 44 will be rotated by motor 10 in one direction while the rotor 46 will be driven by motor 13 in an opposite direction. Hence, the signal generator 44 will provide a signal that is proportional to the angles through which the two servomotors have deflected the "ailavators," and when this signal serves to reduce the resultant signal input to roll amplifier 8 to zero the two servomotors will become stationary. At the same time, the servomotors 10 and 13 drive the rotors of the signal generator 49, rotor 50 being driven in one direction by the servomotor 13 and the rotor 51 being driven in the same direction by the motor 10. Hence, the signal output of signal generator 49 is proportional to any difference between the angular displacements of the two "ailavators." If such difference exists, the signal output of signal generator 49 is fed back in degenerative fashion to the pitch amplifier 9 to thereby modify the operations of the two servomotors in such fashion that the displacements of the two "ailavators" will be equal. Obviously, in the systems of both Fig. 1 and Fig. 5, the phase sense of the feedback signal will depend upon which of the servomotors provides the greater displacement in its output. Hence, the "ailavator" having the greater displacement will always be moved in a direction to reduce the displacement and the "ailavator" having the lesser displacement will be moved in a direction to increase its displacement until the two displacements are equal.

Under a pitch signal, the two servomotors will provide like directions of movement of the "ailavators," the output of signal generator 49 being employed as the degenerative displacement feedback signal. If the displacements are unequal, the rotors of signal generator 44, being rotated in like directions, will result in a feedback signal being fed to the roll amplifier which is proportional to the angular difference in the displacements of the two "ailavators." The feedback signal so supplied to the roll amplifier will produce movements of the "ailavators" in opposite directions until the displacement angles of both "ailavators" are equal and, of course, in the same direction.

It will be understood as hereinabove pointed out in connection with Fig. 1 that the correcting action of the signal generators, in addition to providing a positional repeatback, occurs during movements of the "ailavators" under control of the roll or pitch signals thereby preventing improper operation of the craft "ailavators" at all times. Hence, no roll correction will be necessary when a pitch signal alone is present and, vice versa, no pitch correction need be effected when a roll signal alone is present.

While I have described my invention in its preferred embodiments it is to be understood that the words which I have used are words of description rather than of limitation and that changes within the purview of the appended claims may be made without departing from the true scope and spirit of my invention in its broader aspects.

What is claimed is:

1. A system of the character described, comprising a first and second servomotor loop, each comprising a servomotor, a source of control signal for controlling the servomotors in both loops, a pair of signal generators driven by each servomotor, one of the signal generators driven by the two servomotors, respectively, being electrically connected together for providing a first feedback signal and the other two signal generators driven by the servomotors, respectively, being electrically connected together for providing a second feedback signal, means for supplying one of said feedback signals in like polarity sense to both servo loops, and means for supplying the second feedback signal in respectively opposite polarity senses to both servomotor loops.

2. In a control system for aircraft having a pair of control surfaces adapted to move said aircraft about two craft axes, the combination therewith of a first servo mechanism for operating the first of said surfaces, a second servo mechanism for operating the second of said surfaces, first and second sources of control signal for controlling both servo mechanisms in the same and opposite senses respectively, signal generators having their outputs connected in feedback fashion to oppose respectively the signals supplied by said first and second sources and means responsive to the outputs of both servo mechanisms for controlling the signal output from each of said generators.

3. In a control system for aircraft having "ailavator" controls, the combination with a pair of "ailavators" of a first servo mechanism for operating the first of said "ailavators," a second servo mechanism for operating the second of said "ailavators," first and second control signal sources for supplying control signals to both of said servo mechanisms, one signal source being connected to said servo mechanism for providing similar directions of movement of said "ailavators" and the other signal source being connected to said servo mechanism for providing opposite directions of movement of said "ailavators," a pair of signal generator means, each comprising two movable parts and the movable parts of each of said means being driven, respectively, by each of said servo mechanisms, means for connecting the output of one of said signal generator means in feedback fashion to said first signal source for opposing said first signal supplied to both loops and means for connecting the signal output of the other signal generating means in feedback fashion to said second signal source for opposing said second signal supplied to both servo loops.

4. In a control system for aircraft having "ailavator" controls, the combination with a pair of "ailavators" of a first servo mechanism for operating the first of said "ailavators," a second servo mechanism for operating the second of said "ailavators," first and second control signal sources for supplying control signals to both of said servo mechanisms, one signal source being connected to said servo mechanisms for providing similar directions of movement of said "ailavators' and the other signal source being connected to said servo mechanisms for providing opposite directions of movement of said "ailavators," a pair of data transmission systems each comprising a selsyn-like signal generator and signal transformer, the signal generator and transformer of each data transmission system being respectively driven by said servo mechanisms, means connecting the output of one of said data transmission system in feed-back fashion to said first signal source for opposing said first control signal supplied to both servo loops and means connecting the output of the other data transmission system in feedback fashion to said second signal source for opposing the second of said control signals supplied to both servo loops.

5. In a control system for aircraft having "ailavator" controls, the combination with a pair of "ailavators" of a first servo mechanism for operating the first of said "ailavators," a second servo mechanism for operating a second of said "ailavators," a first and second control signal source connected to supply control signals to said servo mechanisms, one signal source being connected to said servo mechanisms for providing similar directions of movement of said "ailavators" and the other signal source being connected to said servo mechanisms for providing opposite directions of movement of said "ailavators," first and second selsyn-like signal generators, each having two relatively movable parts, one part of each generator being driven by the output of one of said servo mechanisms and the other part of each generator being driven by the output of the other servo mechanism, means for feeding the signal output of one of said signal generators in feedback fashion to said first signal source in opposition to said first signal and means for supplying the output of the other signal generator in feedback fashion to said second signal source in opposition to said second signal.

6. An "ailavator" control system for aircraft comprising a first and second servomotor loop, each comprising an amplifier, a servomotor controlled by each amplifier and a signal generator driven by each servomotor, a vertical reference device having pick-offs for providing separate control signals proportional respectively to the roll and pitch attitude of said aircraft, an impedance bridge network having the control signal from one of said pick-offs supplied across one diagonal thereof and the control signal from the other of said pick-offs supplied across the other diagonal thereof, means for connecting the input of the amplifier of the first servomotor loop across substantially mid points of the impedances constituting a first pair of opposite bridge arms, means for connecting the input of the amplifier of the second servomotor loop across substantially mid points of the impedances constituting the second pair of opposite arms of the bridge, whereby said roll signal effects opposite operation of both servomotors and said pitch signal will effect like operation of both servomotors, means for connecting the signal generators driven by said servomotors in degenerative feed-back fashion with said roll and pitch pick-off signals respectively, and means intercoupling the outputs of the servomotors of each loop for modifying the feed-back signals supplied by each loop.

7. A control system of the character recited in claim 6 in which the signal generators are devices of the selsyn type and the means for modifying the feed-back signal in each loop comprises a selsyn-like device driven in accordance with the servomotor output in one loop and electrically connected to the signal generator in the other loop.

8. A control system of the character recited in claim 6 in which the signal generators are selsyn-like devices having relatively rotatable stator and rotor parts, the rotor parts of each device being driven by the servomotor in its associated loop, and the means for modifying the feed-back signal in each loop comprises a mechanical connection arranged to drive the stator part of the selsyn-like signal generator in one loop in accordance with the output of the servomotor in the other loop.

9. An "ailavator" control system comprising a first and second servomotor loop, each comprising an amplifier, a servomotor controlled by the amplifier and a pair of selsyn-like devices driven by each of the servomotors, a source of control signal for controlling the servomotors in both loops, a first of the selsyn-like devices in each loop being connected in feed-back fashion with said source for opposing the signal supplied to the respective loops and the second selsyn like device in each loop being electrically connected with the first selsyn-like device in the other loop in such a manner that the second selsyn-like device in each loop modifies the feed-back signal supplied by the first selsyn-like device in each loop whereby the operation of each one of the servomotor loops is modified by the operation of the other servomotor loop.

10. A control system for aircraft having a pair of control surfaces for controlling the pitch and roll attitude of said aircraft, the combination therewith comprising a first closed-loop servo system for operating the first of said surfaces, a second closed-loop servo system for operating a second of said surfaces, a first and second control signal source, mixing means responsive to the signals supplied by said source for providing two outputs, one output being connected to both servo systems for providing similar directions of movement of said surfaces and the other being connected to both servo systems for providing opposite directions of movement of said surfaces, a pair of signal generating means each having two movable parts, the movable parts of each signal generating means being driven respectively by each servo system, means for connecting the output of one of said signal generating means in feed-back fashion with said first signal source for opposing the first signal supplied to said mixing means and means for connecting the output of the other signal generating means in feed-back fashion with said second source for opposing the second signal supplied to said mixing means.

References Cited in the file of this patent
UNITED STATES PATENTS

| | | |
|---|---|---|
| 2,417,821 | Harcum et al. | Mar. 25, 1947 |
| 2,462,081 | Esval | Feb. 22, 1949 |
| 2,525,636 | Bedford et al. | Oct. 10, 1950 |
| 2,558,096 | Markusen | June 26, 1951 |